US006418955B2

(12) United States Patent
Lewis et al.

(10) Patent No.: US 6,418,955 B2
(45) Date of Patent: Jul. 16, 2002

(54) MULTIPLE FEED POWDER SPLITTER

(75) Inventors: Gary K. Lewis; Richard M. Less, both of Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/841,770

(22) Filed: Apr. 24, 2001

Related U.S. Application Data

(63) Continuation of application No. 09/523,260, filed on Mar. 10, 2000, now Pat. No. 6,263,918.
(60) Provisional application No. 60/131,827, filed on Apr. 29, 1999.

(51) Int. Cl.[7] .................................................. F16L 1/00
(52) U.S. Cl. ..................... 137/10; 137/561 A; 137/268; 251/367
(58) Field of Search ............................ 137/597, 561 A, 137/861, 1, 10, 268; 251/367

(56) References Cited

U.S. PATENT DOCUMENTS 2,734,224 A 2/1956 Winstead
3,936,262 A 2/1976 Hehl ...................... 137/561 A
3,953,205 A 4/1976 Cox et al.
3,958,467 A 5/1976 Borzyam
4,017,240 A 4/1977 Nelson ................... 425/192 R
4,193,420 A 3/1980 Hewson ...................... 137/356
4,302,338 A 11/1981 Pfohl et al. ................. 210/752
4,565,216 A 1/1986 Meier ..................... 137/561 A
4,859,824 A 8/1989 Ukaji et al.
5,182,430 A 1/1993 Lagain
5,601,115 A 2/1997 Broerman
5,651,901 A 7/1997 Mohri et al.
5,879,632 A 3/1999 Demers ...................... 422/100
5,900,170 A 5/1999 Marcin, Jr. et al. ........... 137/13
5,950,651 A 9/1999 Kenworthy et al. .......... 422/99
5,961,925 A 10/1999 Ruediger et al.
5,992,453 A 11/1999 Zimmer .................. 137/561 A
5,993,554 A 11/1999 Keicher et al.
6,085,783 A 7/2000 Hollingshead .............. 137/597
6,094,207 A 7/2000 Wen et al. ............... 346/140.1

*Primary Examiner*—A. Michael Chambers
(74) *Attorney, Agent, or Firm*—John P. O'Banion

(57) ABSTRACT

A device for providing uniform powder flow to the nozzles when creating solid structures using a solid fabrication system such as the directed light fabrication (DLF) process. In the DLF process, gas entrained powders are passed through the focal point of a moving high-power laser light which fuses the particles in the powder to a surface being built up in layers. The invention is a device providing uniform flow of gas entrained powders to the nozzles of the DLF system. The device comprises a series of modular splitters which are slidably interconnected and contain an integral flow control mechanism. The device can take the gas entrained powder from between one to four hoppers and split the flow into eight tubular lines which feed the powder delivery nozzles of the DLF system.

9 Claims, 7 Drawing Sheets

MULTIPLE FEED POWDER SPLITTER

This application is a continuation of U.S. application Ser. No. 09/523,260 filed on Mar. 10, 2000, now U.S. Pat. No. 6,263,918, which claims priority from U.S. provisional application Ser. No. 60/131,827 filed on Apr. 29, 1999.

STATEMENT REGARDING FEDERALLY SPONSORED RESEARCH OR DEVELOPMENT

This invention was made with Government support under Contract No. W-7405-ENG-36, awarded by the Department of Energy. The Government has certain rights in this invention.

REFERENCE TO A MICROFICHE APPENDIX

Not Applicable

BACKGROUND OF THE INVENTION

1. Field of the Invention

This invention pertains generally to directed light fabrication processes, and more particularly to a device which provides uniform distribution of gas-carried material powder within a directed light fabrication system.

2. Description of the Background Art

Fabrication of three-dimensional solids by means of directed fabrication, such as directed light fabrication (DLF), involves injecting powders into a high energy density moving beam, such as a laser light beam. The powders are carried by a stream of gas, commonly argon, to the focal point of the laser beam wherein material fusing occurs. The gas provides a non-reactive carrier for the particles of the powder which are to be fused into a solid. In practice, though, the powder is often injected non-uniformly about the beam resulting in a build-up from the fused powder material that is also of non-uniform structure. The lack of uniformity is particularly noticeable when the laser beam changes direction, thereby causing a different orientation of powder injection relative to the beam motion. This lack of uniformity in the resultant solid due to the improperly distributed powders becomes even more pronounced when fabricating alloy solids from a combination of powders.

Achievement of a uniform finished structure therefore requires uniformity of powder injection. The multiple feed powder splitter in accordance with the present invention when used with a multiple-outlet nozzle for powder disbursement satisfies that need, as well as others, and overcomes deficiencies in current powder feed techniques.

BRIEF SUMMARY OF THE INVENTION

The present invention distributes controlled powder flow rates to a series of output lines for dispersing powder which is entrained within a gas through nozzles for use within the directed light fabrication (DLF) process. The device comprises a number of modular splitter blocks which can be slidably interconnected. The slidable connection incorporates an integral flow control means that requires no moving parts. A combination of splitter blocks are interconnected to receive a flow of gas entrained powder from one or more hoppers. The flow of gas entrained powder is split into a number of tubular lines which are connected to feed the powder delivery nozzles.

An object of the invention is to split the flow of gas entrained powder into a series of output lines.

Another object of the invention is to control the relative amount of powder flowing into each powder flow splitter block without the need of moving parts employed within separate valve assemblies.

Another object of the invention is to provide a powder flow splitter system that allows configuration for various numbers of hoppers for supplying the powder material.

Another object of the invention is to provide for modular mechanical block interconnections which allow for rapid assembly, flow adjustment, and tear-down.

Another object of the invention is to provide an integrated flow control means for equalizing the flow of gas entrained powder.

Another object of the invention is to provide gas entrained powder flow passageways that do not restrict powder flow or unduly clog up.

Another object of the invention is to provide uniform distribution of incoming powder material among two outgoing passageways.

Another object of the invention is to provide a flow control means with minimal susceptibility to failure.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings for illustrative purposes, the present invention is embodied in the apparatus generally shown in FIG. 1 through FIG. 17. It will be appreciated that the apparatus may vary as to configuration and as to details of the parts, and that the method may vary as to the specific steps and sequence, without departing from the basic concepts as disclosed herein.

Figure 1:
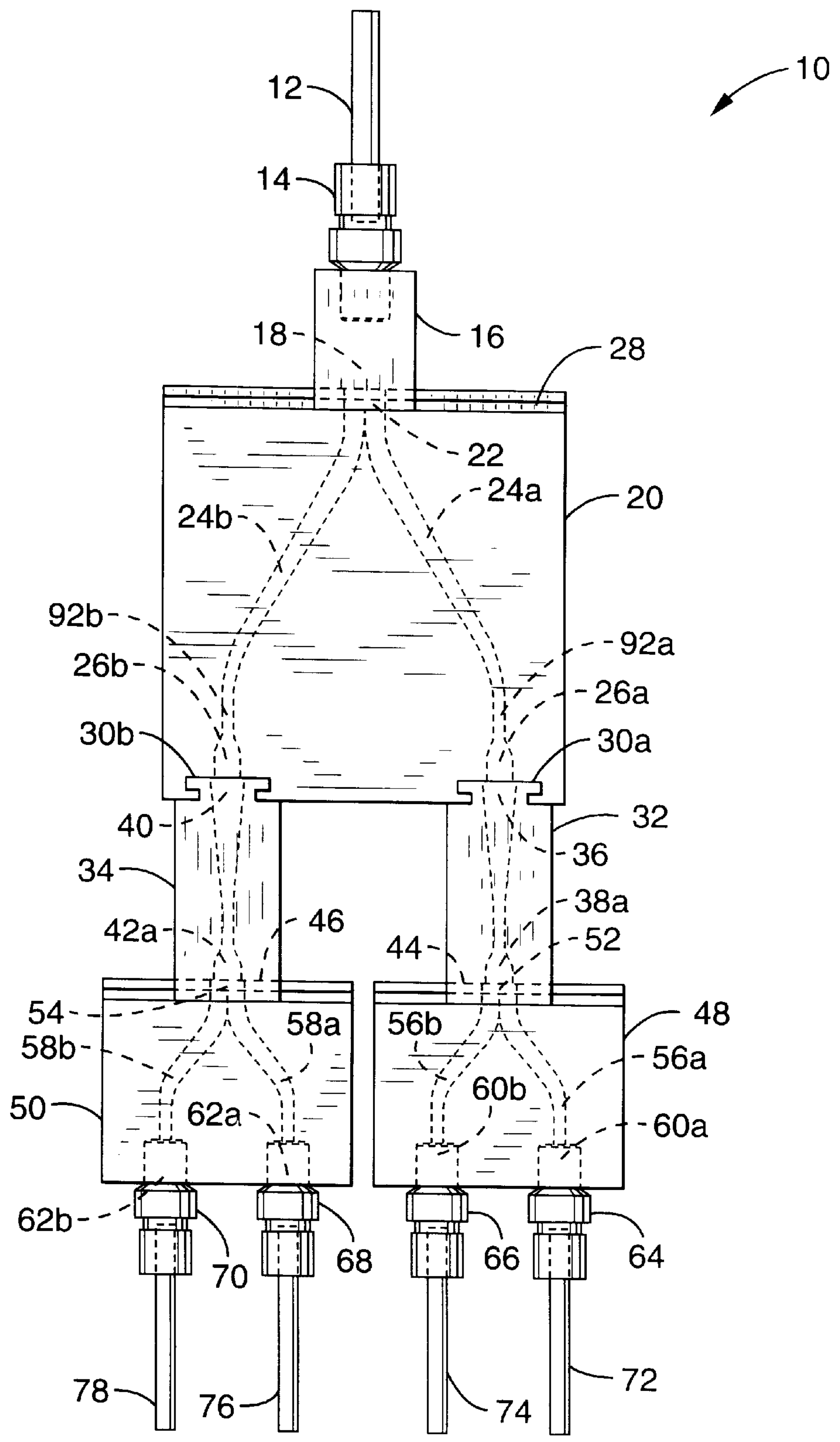
FIG. 1 is a front view of a one-to-eight way gas entrained powder splitter according to the invention, with three tiers of interconnected splitter blocks shown.

Referring first to FIG. 1, a three-tier gas entrained powder splitter 10 according to the present invention is shown. The splitter shown has been modularly assembled from a source feed connection block 16, a first-tier splitter block 20, a pair of second-tier splitter blocks 32, 34, and four third-tier splitter blocks 48, 50 (two of the third-tier splitter blocks are hidden in this view). The third-tier of splitter blocks within this embodiment incorporate output tubing connectors for communicating the gas entrained powder to a set of nozzles within the directed light fabrication (DLF) system.

Figure 7:
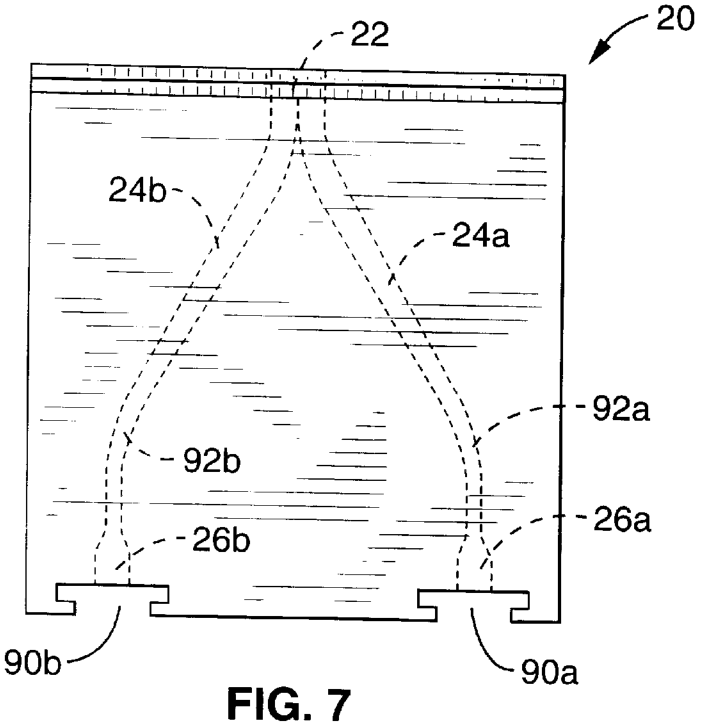
FIG. 7 is a front view of a first-tier splitter block according to the invention.

In use, an input source line 12 is connected to a hopper (not shown) which provides the powder that is entrained within a gas carrier, such as argon. The gas entrained powder enters the tubing of the input source line 12 and passes through a tubing connector 14 which is integral to a source feed connection block 16, whose exit port 18 terminates at a slidable connection interface 28 with the first-tier splitter block 20. An entry port 22 of the first-tier splitter block 20 has an enlarged entry chamber which allows the powder entering the splitter block to spacially disperse prior to reaching the dividing wall that separates the flow between two flow passageways 24*a*, 24*b* within the splitter block. Referring also to FIG. 7, on traversing a path toward exit, the passageways 24*a*, 24*b* taper down to straight, non-tapered sections 92*a*, 92*b*, respectively, and then open up into chambers on the two exit ports 26*a*, 26*b*, respectively, of the first-tier splitter block 20.

A slidable track engagement mechanism 28 at the input side of the first-tier splitter block 20, and slidable track engagements 30*a*, 30*b* on the output end of the splitter block providing inter-modular connections on the splitter block. The slidable track engagements are slotted retention mechanisms which hold the blocks to one another, wherein an exit port of one module can be slid into alignment with an entry port of another module. The alignment of passageways can be slidably varied so as to control the flow of gas entrained powder between the modular sections of the invention. Connected at right angles to the first-tier splitter block 20 are two second-tier splitter blocks 32, 34, each similarly having an entry port 36, 40 with a chamber and pairs of exit ports 38*a*, 38*b* (hidden in this view), 42*a*, and 42*b* (hidden in this view), respectively. Slidable track engagements 44, 46 connect these second-tier splitter blocks 32, 34 with a group of four third-tier splitter blocks 48, 50 (two blocks are hidden in this view). As with the other modular sections, each of the third-tier splitter blocks is connected orthogonally to the preceding modular section, and contain entry ports 52, 54, with flow passageways 56*a*, 56*b*, 58*a*, 58*b*, along with exit ports 60*a*, 60*b*, 62*a*, 62*b*. The exit ports of these third-tier splitter blocks have terminations to connect with tubing for routing the gas entrained powder to the nozzle of the DLF system. Four of the eight tubing connectors 64, 66, 68, 70, are shown connecting to their respective output nozzle feed lines 72, 74, 76, 78, for moving the material powder to the nozzles which are directed to the point of focus of the laser beam.

Figure 2:
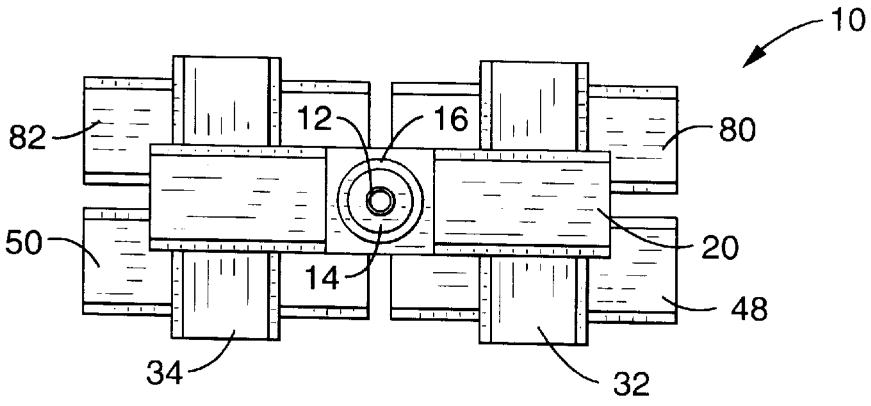
FIG. 2 is a top view of the three-tier gas entrained powder splitter of FIG. 1.
Figure 3:
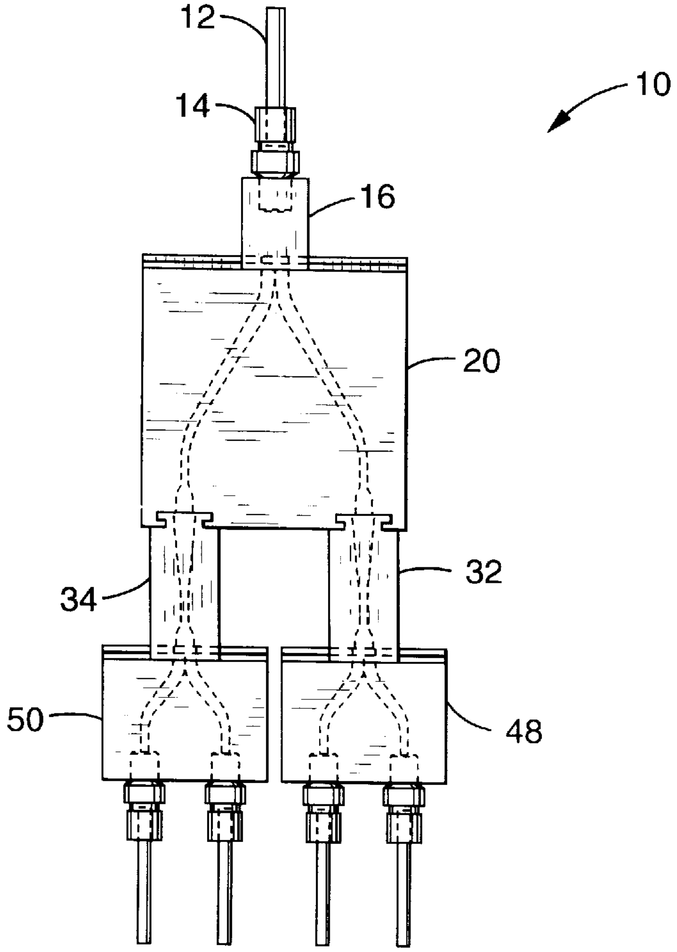
FIG. 3 is a front view of the three-tier gas entrained powder splitter of FIG. 2.
Figure 4:
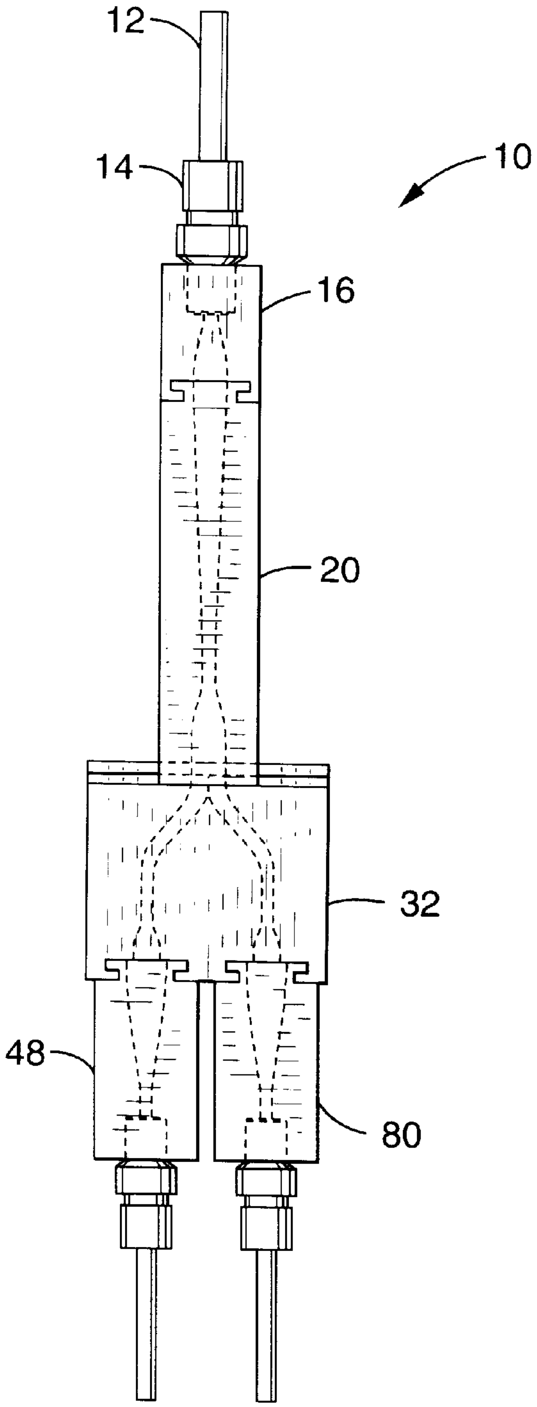
FIG. 4 is a side view of the gas entrained powder splitter of FIG. 2.

FIG. 2 shows previously hidden third-tier splitter blocks 80, 82 within the three-tier, eight-way splitter embodiment 10, along with the first and second third-tier splitter blocks 32, 34 which are shown in FIG. 3. In FIG. 4, the three tier splitter block is shown with first and third tiers of the splitter blocks in profile.

The splitter block modules for this embodiment may be produced by machining channels within the faces of a pair of block halves (or a split block) by the use of, for example, CNC machining equipment. The splitter blocks can be fabricated from any suitably hard material, although metals are preferred. The two sections are then joined together to form a splitter block that contains integral passageways. The tracks can likewise be machined into the blocks to provide for modular attachment and flow regulation between sections.

Note that the two separate flow passageways shown within each tier of splitter blocks gradually taper down in diameter from a corresponding chambered entry port and separate laterally in distance to provide room for the exit ports to connect to the next tier. Preferably, the passageways are directed downward at approximately a 45° angle to the vertical, and gradually taper in diameter to a smaller constant diameter vertical straight section before reaching the exit port. The diameter of the separate passageways at the split is preferably approximately one-half of the cross sectional area of the combined passageways prior to the split, so that the velocity of the gas entrained powder remains constant during that portion of the splitter block. The straight section transfers the gas entrained powders to the larger diameter chamber of the exit port just prior to flowing into the entry port of a succeeding splitter block. By straightening the flow path, the stream of particulates is not affected by changes in tube diameter or curvature changes in the passageways which can otherwise distort the flow path in the division chamber. The smaller diameter straight section serves to straighten the flow path, increase the velocity of gas and particulates, and disperse the particulates to lower aerial density as they enter the enlarged volume of the chamber prior to division into channels in the next block. The effect of increasing the velocity may be secondary to creating increased uniformity of the dispersion effect as the gas entrained powder leaves the straight section and enters the area of lower aerial density within the chamber of the exit port. The lower aerial particulate density produces a higher resolution of adjustment to try to equalize the mass of powder going down each passageway in the new tier. The enlarged chambers at the entry and exit ports also provide a higher resolution for the control of the flow of gas entrained powder. The higher resolution simplifies making balancing adjustments to the flow of gas entrained powder through the output tubes (typically eight) to the laser focal zone of the solids fabrication system.

Figure 5:
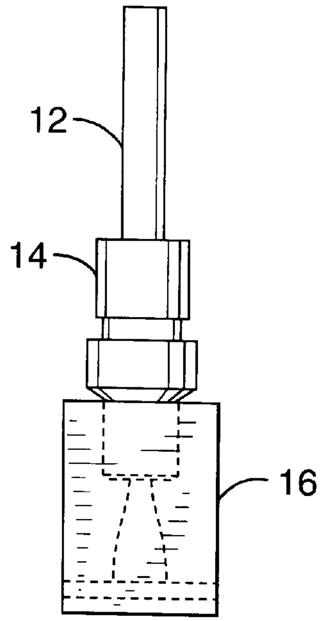
FIG. 5 is a front view of a source feed connection block according to the invention.
Figure 6:
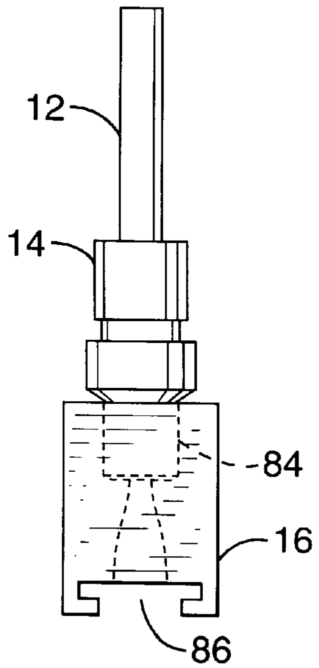
FIG. 6 is a side view of the source feed connection block of FIG. 5.

FIG. 5 and FIG. 6 show the source feed connection block 16 in more detail. Standard swaged tubing fittings (7/16-20 swaged tube fittings containing an O-ring) or the like can be used for interfacing the tubing with the modular blocks of the inventive embodiment. The tube fittings connect with ¼ inch Polyflow™ tubing or the like. It is generally preferable that the inlet tubes should have a larger diameter than the output tubes, for instance the use of inlet tubing with an inside diameter of 0.170 inches and output tubing with an inside diameter of 0.118 inches. Various alternative mechanisms for providing fluid communication to and from the splitter blocks of the present invention will be obvious to one of ordinary skill in the art.

Referring to FIG. 5, the input source line 12 connects to a source of gas entrained powder from a hopper (not shown).

In FIG. 5 the tubing of the input source line 12 is shown retained by tubing connector 14. In FIG. 6 the source feed connection block 16 module is shown in a side view configured with a connector receptacle 84 into which the tubing connector 14 has been press-fit. The female track slot 86, which can be easily seen in this view, connects with a mating section of male track to provide block-to-block slidable interconnection.

Figure 8:
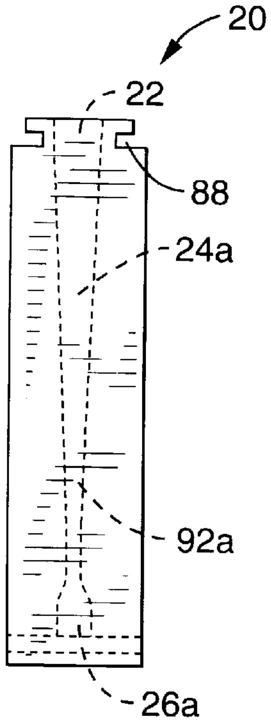
FIG. 8 is a side view of the first-tier splitter block of FIG. 7.

FIG. 7 and FIG. 8 show an individual first-tier splitter block 20. In FIG. 8 the male track 88 can be seen which mates with the female track 86 of the source feed block 16 as shown in FIG. 6. The first-tier splitter block 20 (FIG. 7) is configured for the attachment of two modular block sections by means of the female track slots 90*a*, 90*b*. Flow passageway 24*a* can be seen in FIG. 8 with entry port 22 providing an expansion chamber within the passageway that tapers down to section 92*a* which, as described previously, is a short straight section that opens up again near exit port 26*a*. Note again that, as the cross-sectional area of the passageway decreases, the gas/powder velocity increases proportionally. Thus, on each side of the tier interface the powder moves from a narrow passageway where velocity is highest to a larger opening defined by the size of the dual channel on the opposite side of the tier boundary. By transitioning from one passageway into two, the area is roughly cut in half and the velocity stays approximately the same as the velocity in the larger area prior to splitting. The gradual decrease in diameter to a minimum in the straight vertical section helps increase particular velocity prior to splitting again.

Figure 9:
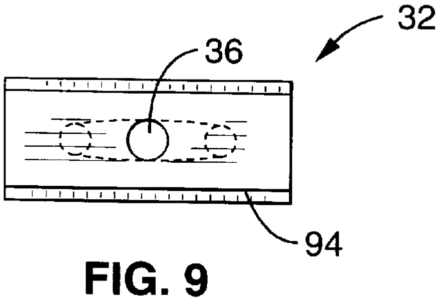
FIG. 9 is a top view of a second-tier splitter block according to the invention.
Figure 10:
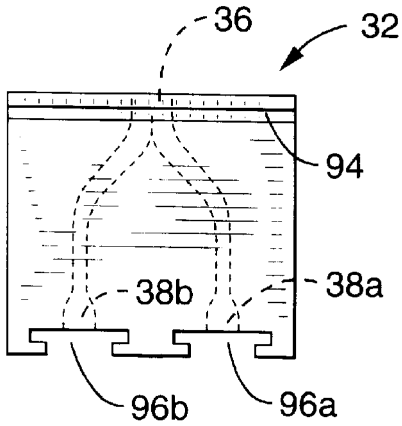
FIG. 10 is a front view of the second-tier splitter block of FIG. 9.
Figure 11:
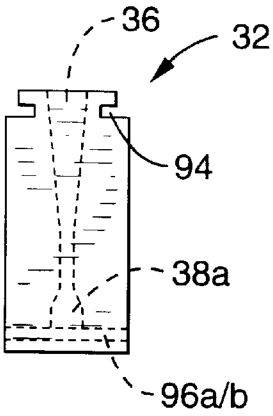
FIG. 11 is a side view of the second-tier splitter block of FIG. 9.

FIG. 9 through FIG. 11 are three views of a second-tier splitter block 32. FIG. 9 is a top view showing entry port 36 as a generally circular hole on the slidable connection edge of the block. When connected with another module, the circular hole is generally positioned in alignment with the circular hole of the passageway in the preceding module wherethrough gas entrained powder may be communicated. The slidable connection can be intentionally mis-aligned to achieve a controllable flow restriction between modules which is introduced to balance the flow emitted at the nozzles. In FIG. 10 a second-tier splitter block 32 is shown with female track slots 96*a*, 96*b* which provide for attachment of subsequent modules. It should be recognized that succeeding modules may comprise splitters, or tubing connectors similar to the source connector 16 with either male or female track connections. In FIG. 11 the male track 94 of this second-tier splitter block is clearly shown.

Figure 12:
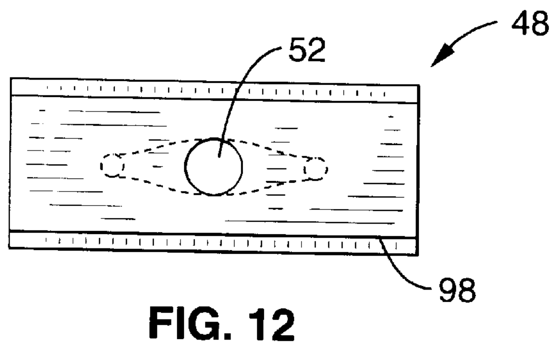
FIG. 12 is a top view of a third-tier splitter block according to the invention.
Figure 13:
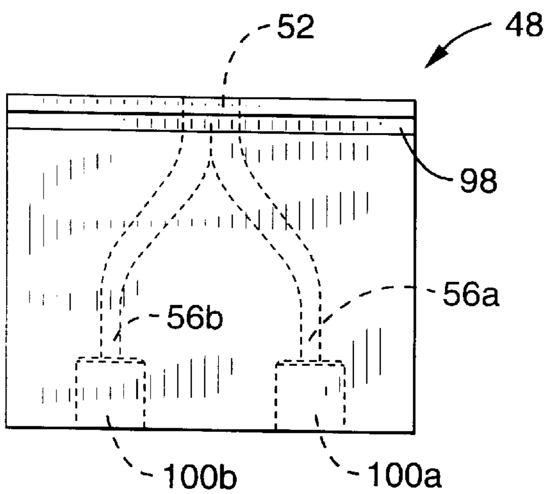
FIG. 13 is a front view of the third-tier splitter block of FIG. 12, shown without output connectors in place.
Figure 14:
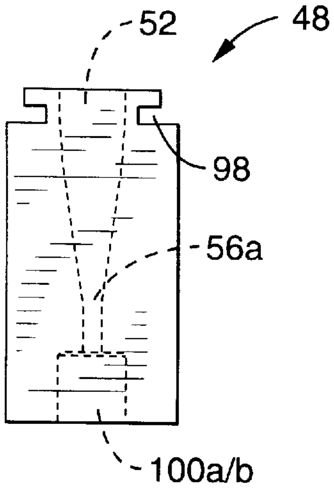
FIG. 14 is a side view of the third-tier splitter block of FIG. 12.

FIG. 12 through FIG. 14 show a third-tier splitter block 48. In FIG. 12 the passageway 52 and longitudinal track 98 can be seen. In FIG. 13 and FIG. 14 the connector receptacles 100*a*, 100*b* are shown on the exit portions of the passageways beyond the straight sections 56*a*, 56*b*, which follows the curving tapered sections from the entry port 52. The connector receptacles 100*a*, 100*b* are configured for receiving a pair of tubing connection fittings (not shown).

The preferred tapering and chambers within the channels of the splitter blocks are included to improve the flow of gas-entrained powder through the splitter system. The larger channel diameter within the curved section of the channel reduces flow path distortion, while the straight constricted sections preceding the chambered exit ports act to straighten the flow path while increasing the velocity of the gas and particulates. The particulates then become dispersed more evenly as they enter the area of lower aerial density within the chamber. The lower aerial density at the exits of the splitter block improve the ease with which the splitter blocks may be adjusted to achieve the desired flow balancing within the system.

When using the two-way splitters of the described embodiment, a set of three tiers (layers) are employed to split one input line into eight output lines. The splitter block modules can also accommodate receiving source feed inputs from more than one hopper, such as might be used in the DLF process when building up alloys. When building up an alloy, it is often desirable to introduce materials from symmetrically opposite ports around the laser beam axis to reduce compositional build-up that may occur if the material was introduced from a single point. Materials may also be changed "on the fly", wherein material is fed from a single hopper at any one time and the selection of hopper is changed during the build up process so as to form a sharp interface of dissimilar metals in the part being built up. For example, to create a sharp interface instead of a mixed alloy, a fraction of a solid being built up can be made with nickel while the remainder is built up from copper. Alternatively, a composite can be formed by layering alternating materials. It is preferable, therefore, that the splitter blocks according to the invention provide the ability to receive material input from a number of hoppers so that different materials may be fed into the head of the solids fabrication system. Use of inputs from multiple hoppers may be accommodated in numerous ways. The first-tier splitter block can be eliminated, wherein a pair of separate hoppers are connected by tubing connections to source feed connection blocks which are connected directly to the second-tier splitter blocks. Four hoppers can be accommodated by making similar tubular connections with the third-tier splitter blocks. Three hoppers can be accommodated by connection of one hopper source line to the second-tier splitter blocks and a pair of hopper source lines to the third-tier splitter blocks (if appropriate balancing is set for the incoming feed rates).

Figure 15:
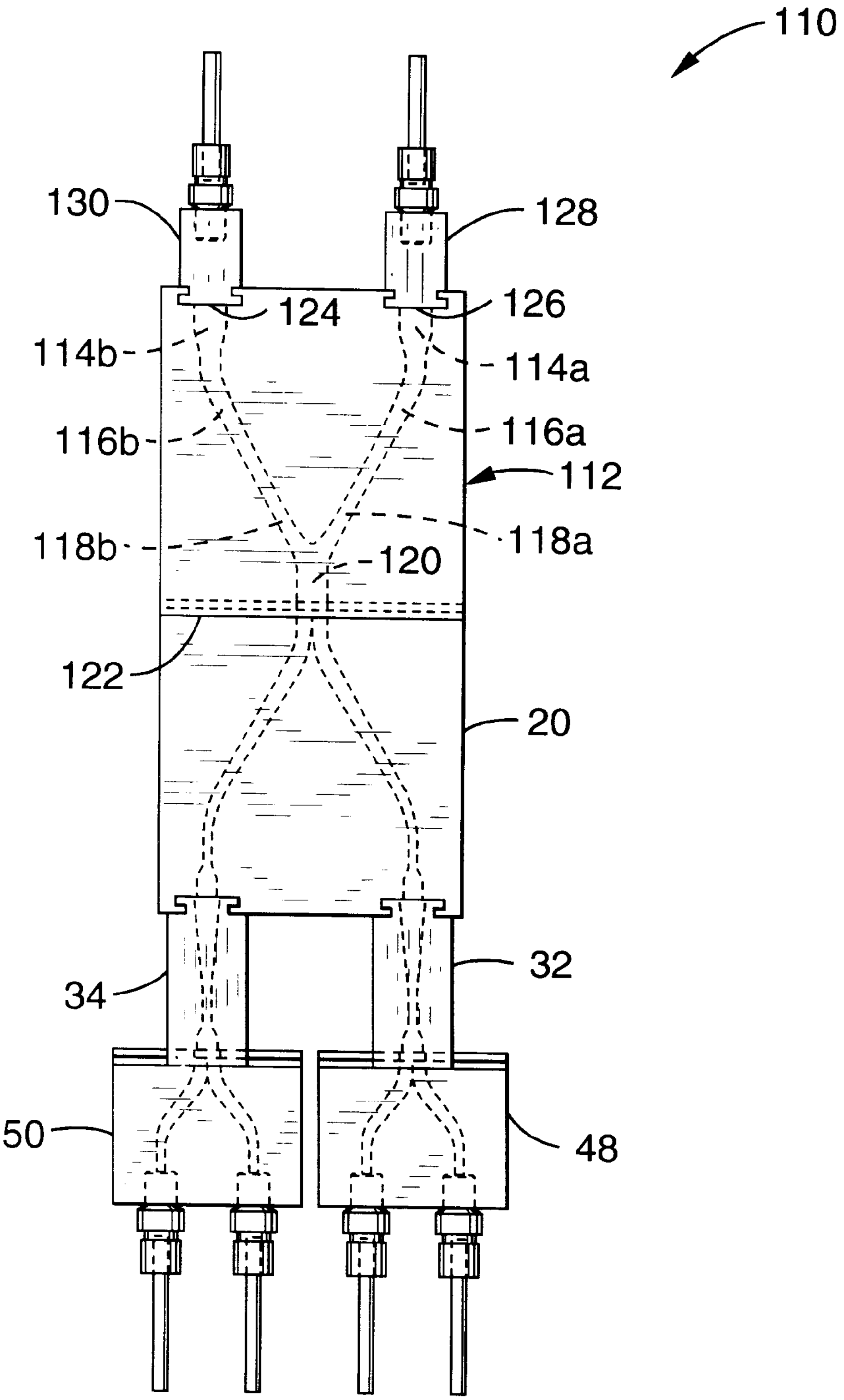
FIG. 15 is a front view of a one-to-eight way gas entrained powder splitter with an attached reverse splitter for receiving and combining gas entrained powders from two hoppers.
Figure 16:
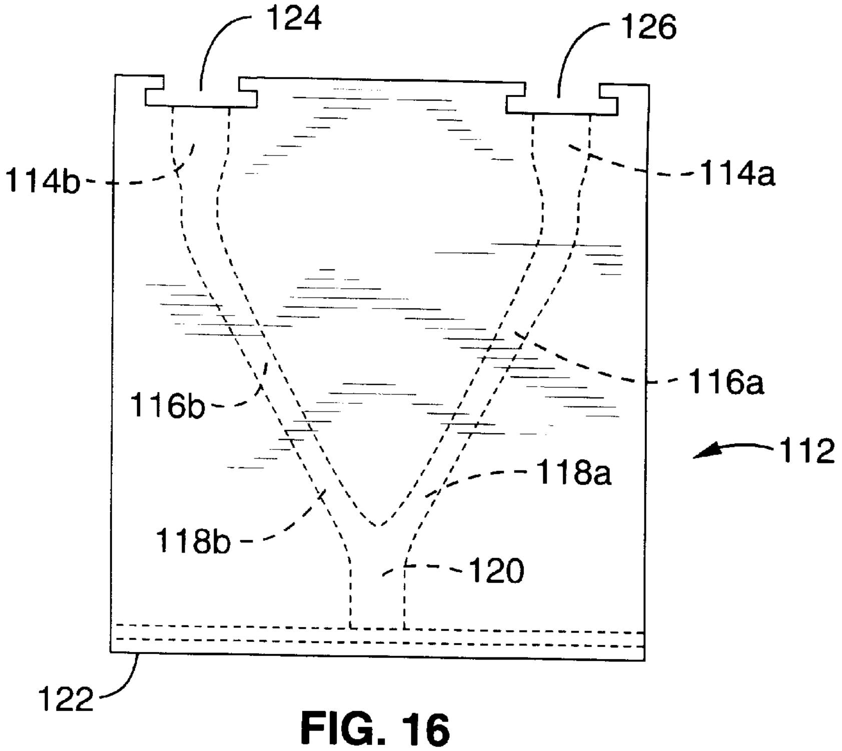
FIG. 16 is a front view of a reversing splitter according to the invention.
Figure 17:
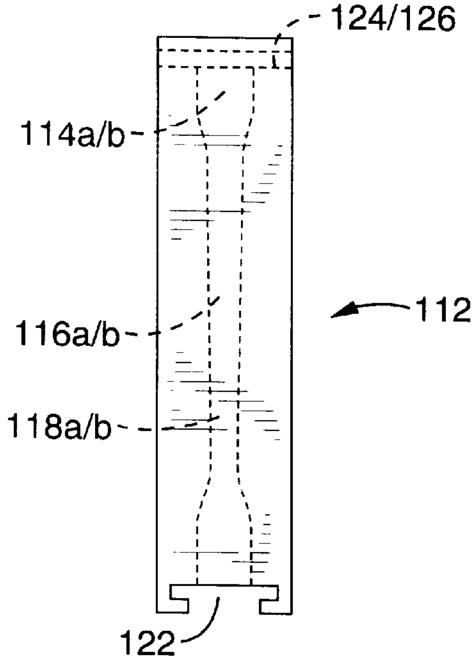
FIG. 17 is a side view of the reversing splitter of FIG. 16.

In addition, to mix different materials from a series of hoppers, splitter blocks may be adapted to perform a reverse split, such that multiple streams of gas entrained powder from the hoppers are combined into a single stream of material before being divided up and traveling to the head of the solids fabrication system. FIG. 15 shows a powder splitter 110 which includes a reverse splitter 112 that is fed gas entrained powder from two separate powder hoppers. This reverse splitter 112 forms the interface to the first level splitter block 20. The reverse splitter 112 has input chambers 114*a*, 114*b* with entry passageways 116*a*, 116*b* that narrow down to passageways 118*a*, 118*b* that are received within a combiner chamber 120 whose singular output flow is received by the splitter 20. The reverse splitter 112 is attached coplanar with the first level splitter block at output connection 122. Inputs 124, 126 of the reverse splitter 112 is configured for attachment of the source feed connections 128,130. The remaining blocks 20, 32, 34, 48, 50 are conventional splitter blocks which divide the incoming gas entrained powder after it has been combined within reverse splitter block 112. Additional reverse splitter blocks may be disposed between the source feed connections 128, 130 and the first reverse splitter block 112 so that the flow from additional hoppers may be combined. FIG. 16 is a detailed view of reverse splitter block 112 showing the inputs 124, 126 and the passageway profiles 114*a*, 114*b*, 116*a*, 116*b*, 118*a*, 118*b* leading into the combiner chamber 120 which terminates at the output connection 122. FIG. 17 is the reverse splitter block 112 showing the side profile of the passageways from entry ports 114*a*, 116*a*, 118*a*, through the output connection 122.

It will be appreciated that the invention can be implemented in a variety of ways without departing from the inventive principles. Although various channel shapes may be used within the splitter blocks, the particular profile shape described in the embodiment is preferred due to its flow characteristics.

The embodiment describes the preferred use of two-way splitting within each splitter block, however the incoming flow within a splitter block can be divided into more than two channels. The number of outputs for a given number of tiers using two-way (binary) splitters is given by $2^n$ where n is the number of tiers used. The symmetrical nature of the passageway division within a binary splitter assures a generally even distribution of the gas entrained powder between the two resultant passageways regardless of pressure, speed, and flow characteristics of the material. The binary splitters are preferred and are used as the basis of this embodiment. Alternatively the splitter blocks can be configured to split in more than two ways, such as trinary splitters. The number of tiers required for a given number of splits may then be reduced (number of splits being given then by $3^n$); however the distribution of material between three planar passageways would generally be dependent on the speed and flow within the system due to the unsymmetrical nature of a three-way (or four-way, five-way, six-way, etc.) planar split. On the other hand, non-planar splitting, wherein flow splitting is performed into a set of non-planar three-dimensionally-arranged passageways, increases manufacturing difficulty and complexity with regard to providing proper interconnection of the splitter block modules.

Accordingly, it will be seen that the invention of a multiple feed powder splitter provides a readily manufactured solution which can provide uniform feeding of gas entrained powder to the nozzles of a directed light fabrication system. The invention provides a simple yet rugged flow control mechanism for balancing powder flow and is modularly configurable for a variety of input to output ratios and hopper systems. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method of providing regulated flow division of a gas entrained powder which enters an input to a splitter block within an interconnected group of splitter blocks and exits through a series of outputs, comprising the steps of:

(a) regulating flow at the input of each splitter block within the group by controlling the extent to which fluidic input and output connections are aligned by a slidable engagement mechanism through which the splitter blocks are interconnected;

(b) dividing a flow from a single passageway to a plurality of passageways within each splitter block; and (c) interconnecting a plurality of splitter blocks in a cascade wherein the desired number of flow divisions are thereupon created.

2. An apparatus for dividing the flow of a gas entrained powder into multiple output streams, comprising:

(a) a splitter block configured to slidably interconnect with an additional splitter block;

(b) an input port on said splitter block;

(c) a plurality of output ports on said splitter block; and (d) a plurality of fluidic passageways within said splitter block, each said passageway connecting said input port with said plurality of output ports.

3. An apparatus as recited in claim 1, wherein slidable interconnection between splitter blocks brings an output port of a first splitter block into fluid communication with an-input port of a second splitter block, and wherein a flow of gas entrained powder can be divided among a plurality of output ports whose number is determined by the number of tiers of splitter blocks which are slidably interconnected.

4. An apparatus as recited in claim 3, wherein slidable interconnection between splitter blocks is facilitated by complementary mating tracks on said splitter blocks.

5. An apparatus as recited in claim 4, wherein movement of the slidable interconnection regulates volume of flow communicated to a slidably attached splitter block, and wherein progressively increasing misalignment between an output port and a slidably engaged input port progressively reduces flow between said ports.

6. An apparatus as recited in claim 1, further comprising a reverse splitter block configured to slidably interconnect with the splitter block, the reverse splitter block being capable of combining a plurality of gas entrained powder inputs into an output that may be received by the interconnected splitter block for subsequent division thereof.

7. An apparatus as recited in claim 6, further comprising a plurality of reverse splitter blocks, each having a plurality of inputs which are combined into a single output, configured for slideable engagement such that gas entrained powders may be combined and communicated from a plurality of material containing hoppers to the inputs of the reverse splitter block.

8. A system for controllably separating the flow of gas entrained powder into multiple output streams directed toward a fabrication system, comprising:

(a) an input connector configured to receive a flow of gas entrained powder;

(b) a plurality of interconnected splitter blocks fluidically coupled with the input connector, each said splitter block comprising (i) an input port, (ii) a plurality of output ports, (iii) a plurality of internal fluidic passageways, each said passageway connecting said input port with said plurality of output ports, and (iv) a slidable engagement mechanism for coupling said splitter block with another splitter block wherein the input port of one splitter block can be brought into substantially sealed fluid communication with one of the output ports of another slidably engaged splitter block so that flow between said input and output ports is controlled by slidably positioning said splitter blocks in relation to each other; and (c) a plurality of output connectors configured to receive gas entrained powder from the splitter blocks and direct the gas entrained powder flow to a fabrication system.

9. An apparatus for dividing the flow of a gas entrained powder into multiple output streams, comprising:

a splitter block configured to slidably, and fluidly, interconnect with an additional splitter block;

an input port on said splitter block;

a plurality of output ports on said splitter block; and a plurality of fluidic passageways within said splitter block, each said passageway connecting said input port with said plurality of output ports.

* * * * *